3,005,468
ROTARY SLEEVE VALVES
Robert L. Erwin, P.O. Box 43, and Eldon E. Hulsey,
P.O. Box 999, both of Durango, Colo.; said Erwin
assignor of one-fourth to said Hulsey
Filed Aug. 13, 1958, Ser. No. 754,860
7 Claims. (Cl. 137—625.31)

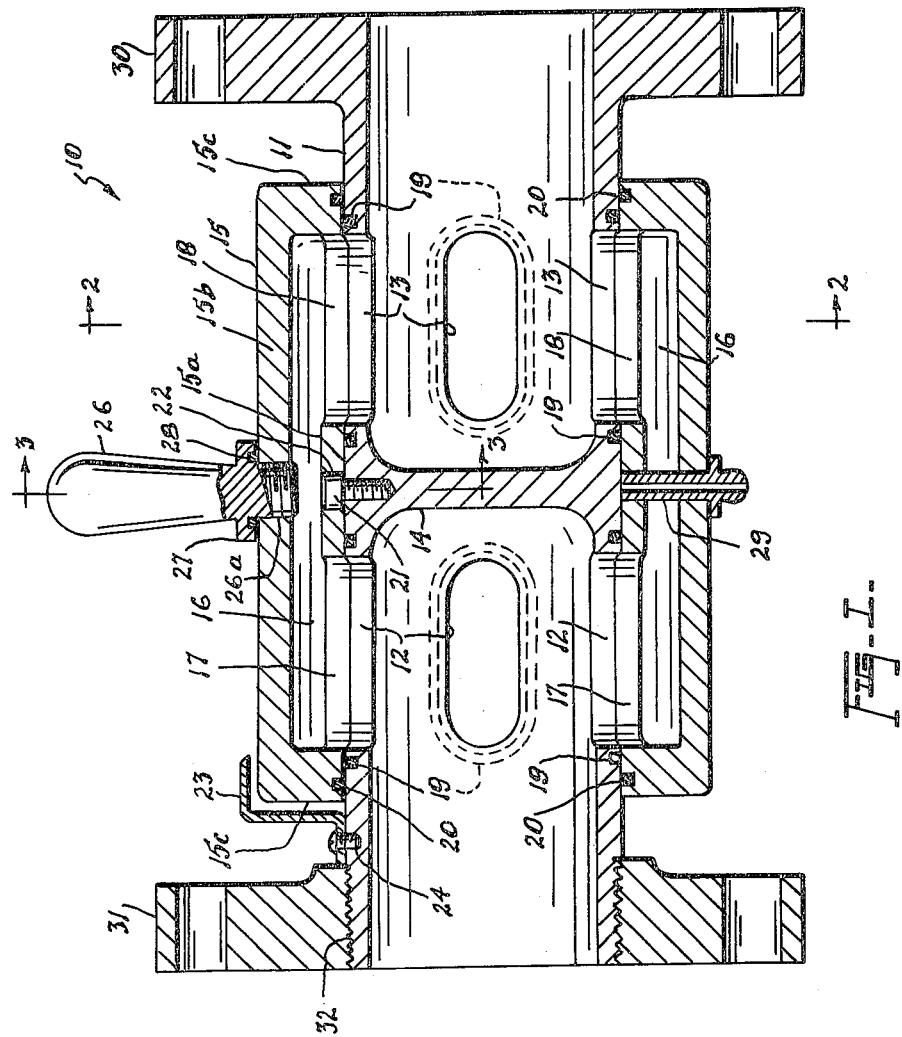

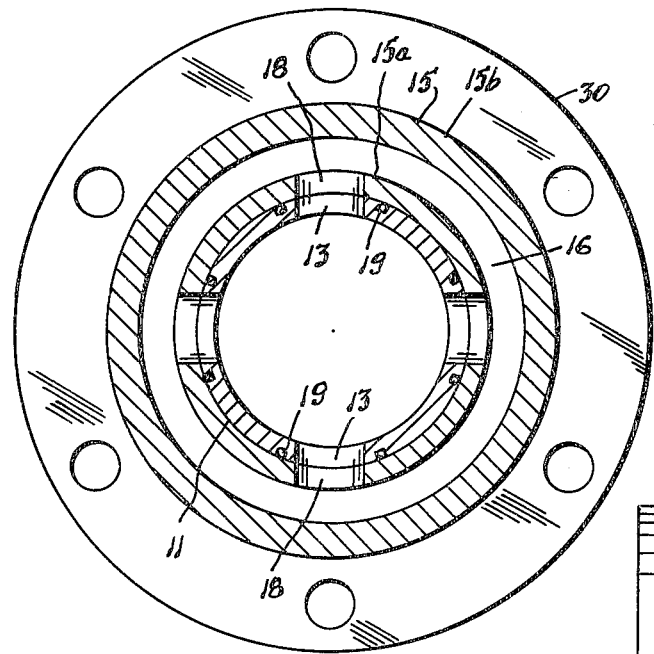
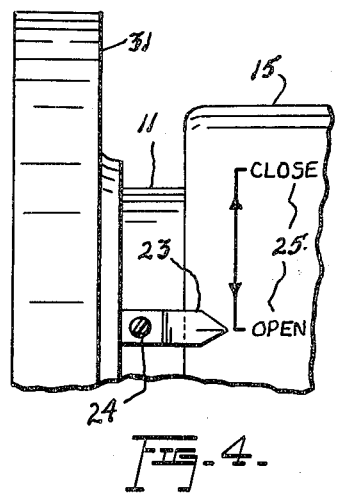
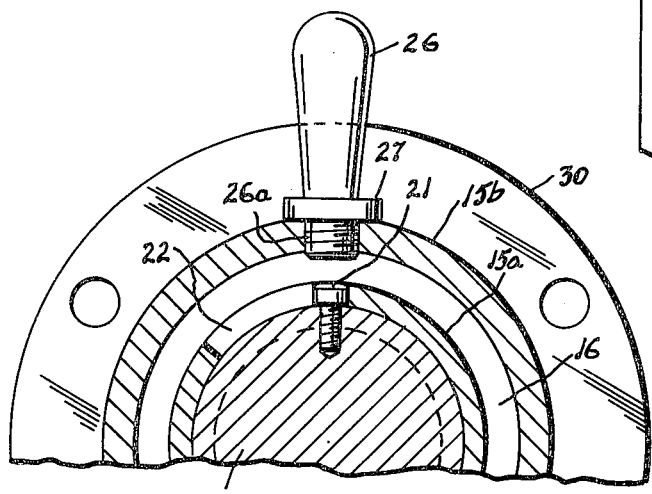
Inventors:
Robert L. Erwin
Eldon E. Hulsey
By Munn Hare
Atty.

This invention relates to new and useful improvements in rotary sleeve valves suitable for either liquids or gases, and the principal object of the invention is to provide a valve of this type which is extremely simple in construction, highly leak-proof, easy to operate, subject to convenient and effective lubrication, and well adapted for expeditious assembly and disassembly to facilitate inspection or repair. As such, servicing of the valve may be undertaken without any special tools, even by persons of limited skill.

Briefly, the valve in accordance with the invention comprises a tubular body provided with longitudinally spaced valve ports and with a partition between the ports, together with a cylindrical sleeve rotatably positioned on the body and having longitudinally spaced port openings connected by an internal passage, the port openings being registrable with the valve ports of the body when the sleeve is rotated on the body to a predetermined position.

An important feature of the invention resides in the particular arrangement of the valve ports and port openings which facilitates opening or closing of the valve by a relatively small rotary movement (such as 45°) of the sleeve on the body, while other features involve the provision of means for limiting the extent of rotation to what is required for opening and closing of the valve, as well as means for readily indicating whether the valve is open or closed.

Another important feature of the invention resides in a novel arrangement of sealing rings for eliminating possible leakage of the valve, one such sealing ring being provided for each valve port and additional sealing rings being employed at the ends of the valve between the body and the sleeve.

Another important feature of the invention resides in the provision of convenient means for lubricating the relatively movable parts of the valve without the necessity of disassembling the same.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a longitudinal sectional view of the valve;

FIGURE 2 is a vertical sectional view, taken substantially in the plane of the line 2—2 in FIGURE 1;

FIGURE 3 is a fragmentary vertical sectional view, taken substantially in the plane of the line 3—3 in FIGURE 1; and FIGURE 4 is a fragmentary top plan view of the indicator means used in the invention.

Referring now to the accompanying drawings in detail, the rotary sleeve valve in accordance with the invention is designated generally by the reference numeral 10 and embodies in its construction a tubular valve body 11 which is provided with pairs of longitudinally spaced valve ports 12, 13, as shown. Any number of pairs of such ports may be provided in the valve body, and for illustrative purposes the drawings show the body with four pairs of ports, spaced 90° apart. The body 11 is also equipped with a transverse partition 14 between the ports 12, 13, so that fluid admitted into either end of the body cannot pass to the other when the valve is closed.

A cylindrical sleeve 15 is rotatably positioned on the valve body 11 and includes inner and outer walls 15a, 15b with closed ends 15c, the walls 15a, 15b defining therebetween an annular space or passage 16. The inner wall 15a of the sleeve is formed with pairs of longitudinally spaced port openings 17, 18, which are of the same size and shape as the ports 12, 13 and are adapted to register respectively therewith when the valve is in its open position, as illustrated.

However, when the sleeve 15 is rotated on the body 11, in this instance through 45°, the openings 17, 18 will come out of register with the ports 12, 13 and the passage of fluid through the valve will be blocked by the partition 14, as aforesaid. On the other hand, in the open position, fluid may flow from either end of the valve body, such as for example, from the left-hand side as shown in FIGURE 1, passing through the ports 12 and openings 17 into the passage 16 and through the openings 18 and ports 13 to the opposite or right-hand end of the valve body. As will be readily apparent, the fluid may enter the valve at either end and leave at the relatively opposite end.

The combined area of the ports 12 and openings 17, in each case, is preferably equal to the area of the inside diameter of the body 11, as is the combined area of the ports 13 and openings 18, in each case, so that there is no restriction of fluid flow through the valve.

The entire sleeve 15 may be formed integrally, such as by casting, or if preferred, the walls 15a, 15b thereof may be separately formed and secured together, such as by welding.

To safeguard against possible leakage, the outer surface of the body 11 is provided with continuous grooves which surround the individual valve ports 12, 13, and continuous sealing rings 19 are positioned in these grooves to frictionally engage the inside surface of the inner wall 15a of the sleeve. As such, a separate sealing ring is provided for each of the valve ports, and in addition, the end portions of the sleeve are formed at the inside thereof with annular grooves accommodating sealing rings 20 which frictionally engage the outer surface of the body 11 at the ends of the valve.

Means are provided for limiting the extent of rotation of the sleeve 15 on the body 11, these means comprising a stop element such as a cap-screw 21 which is threaded in and projects radially outwardly from the body, preferably in the plane of the partition 14, as shown. The projecting head of the screw 21 is disposed in a slot 22 which is formed in the inner wall 15a of the sleeve and extends partly around the inner circumference thereof, the length of the slot being such that when the head of the screw comes in contact with either end thereof, the valve is either open or closed, as will be readily apparent from FIGURE 3.

Means are also provided for indicating the relative position of the sleeve on the body, these means comprising a pointer 23 which is secured to the body by a suitable screw 24 and is readable with respect to "Open" and "Close" indicia 25 provided on the outer surface of the sleeve wall 15b, as illustrated in FIGURE 4.

In addition, means are provided for rotating the sleeve on the body, these means consisting of a suitable handle 26 having a screw-threaded shank 26a extending into the sleeve wall 15b so that the handle projects radially outwardly therefrom. The base portion of the handle is formed with a shoulder 27 having a groove therein to receive a sealing ring 28 in frictional engagement with the outer surface of the sleeve.

A suitable lubricating fitting 29 of any conventional type is mounted in the sleeve 15 so as to extend through the walls 15a, 15b for delivery of lubricant to the outer surface of the body 11, it being noted in this connection that the arrangement of the sealing rings 19 around the individual valve ports 12, 13 is such that the entire area of contact between the body 11 and the relatively rotatable sleeve 15 may be lubricated. The escape of lubricant to the outside of the valve is, of course, prevented by the sealing rings 20.

It may be also noted that apart from its primary purpose as a stop, the element 21 in the slot 22 also functions to prevent longitudinal movement of the sleeve 15 relative to the body 11, whereby the ports 12, 13 are always in alignment with the respective port openings 17, 18.

The valve body 11 may be provided at the ends thereof with suitable attaching flanges 30, 31, one of which may be formed integrally with the valve body and the other removably attached thereto, such as by screw-threads 32, to facilitate removal of the sleeve 15 from the body, when necessary. During such disassembly, the handle 26 may be removed from the sleeve, whereby access may be had through the mounting hole of the handle in the sleeve to the cap-screw 21, and after the cap-screw is removed, the sleeve 15 may be readily slid off the valve body, as will be clearly understood.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

In accordance with our invention the sealing rings 19 provided for each port may also be provided with non-extrusion protectors, where required due to excessive pressures.

What is claimed as new is:

1. In a rotary sleeve valve, the combination of a tubular valve body provided with circumferentially spaced pairs of longitudinally spaced valve ports, a transverse partition provided in said valve body between the ports in each pair, a cylindrical sleeve rotatably positioned on said body and including spaced inner and outer walls defining an annular passage therebetween surrounding the body, the inner wall of said sleeve being provided with circumferentially spaced pairs of longitudinally spaced port openings in communication with said passage and registrable with the respective valve ports when the sleeve is rotated to a predetermined position relative to said body, the outer wall of said sleeve being formed with a screw-threaded opening, a threaded handle for rotating said sleeve removably mounted in said screw-threaded opening, and means concealed within said sleeve for limiting the extent of rotation thereof and preventing longitudinal movement thereof relative to said body, said means comprising a stop element projecting radially outwardly from said body, the inner wall of said sleeve being provided with a slot extending partly around its circumference, said stop element being disposed in said slot and engageable with the ends of the latter, said handle being so positioned on said sleeve that removal of the handle permits access to the stop element through said screw-threaded opening.

2. In a rotary sleeve valve, the combination of a tubular valve body provided with a pair of longitudinally spaced valve ports, a transverse partition provided in said valve body between said ports, a cylindrical sleeve rotatably positioned on said body and including spaced inner and outer walls defining an annular passage therebetween surrounding the body, the inner wall of said sleeve being provided with a pair of longitudinally spaced port openings in communication with said passage and registrable with the respective valve ports when the sleeve is rotated to a predetermined position relative to said body, the outer wall of said sleeve being formed with a screw-threaded opening, a threaded handle for rotating said sleeve removably mounted in said screw-threaded opening, and means concealed within said sleeve for limiting the extent of rotation thereof and preventing longitudinal movement thereof relative to said body, said means comprising a stop element projecting radially outwardly from said body, the inner wall of said sleeve being provided with a slot extending partly around its circumference, said stop element being disposed in said slot and engageable with the ends of the latter, said handle being so positioned on said sleeve that removal of the handle permits access to the stop element through said screw-threaded opening.

3. In a rotary sleeve valve, the combination of a tubular valve body provided with a pair of longitudinally aligned but spaced valve ports, a transverse partition provided in said valve body between said ports, a cylindrical sleeve rotatably positioned on said body, said sleeve being provided at least in one side portion thereof with a longitudinal passage terminating at the ends thereof in a pair of port openings disposed in longitudinally spaced and aligned relation on the inside of the sleeve, said port openings being registrable with the respective valve ports when the sleeve is rotated to a predetermined position relative to said body, the outside of said sleeve being formed with a screw-threaded opening communicating with an intermediate portion of said passage between said port openings, a threaded handle for rotating said sleeve removably mounted in said screw-threaded opening, and means concealed within said sleeve for limiting the extent of rotation thereof and preventing longitudinal movement thereof relative to said body, said means comprising a stop element projecting radially outwardly from said body at a point between said valve ports, a portion of said sleeve between said port openings being provided with a slot extending circumferentially partly around the inside of the sleeve and communicating with said passage in the sleeve, said stop element being disposed in said slot and engageable with the ends of the latter, said handle being so positioned on the sleeve that removal of the handle permits access to said stop element through said screw-threaded opening.

4. The device as defined in claim 1 wherein said valve body is provided with continuous grooves surrounding said valve ports, and continuous sealing rings positioned in said grooves in frictional engagement with the inner wall of said sleeve.

5. The device as defined in claim 3 wherein said valve body is provided with continuous grooves surrounding said valve ports, and continuous sealing rings positioned in said grooves in frictional engagement with the inside of said sleeve.

6. The device as defined in claim 1 together with a fixed pointer secured to said valve body adjacent one end of said sleeve and having a pointer element extending over the outer wall of the sleeve, said outer wall of the sleeve being provided with indicia readable with respect to said pointer element to indicate closed and open positions of the valve.

7. The device as defined in claim 3 together with a fixed pointer secured to said valve body adjacent one end of said sleeve and having a pointer element extending over the outside of said sleeve, the outside of the sleeve being provided with indicia readable with respect to said pointer element to indicate closed and open positions of the valve.

References Cited in the file of this patent

UNITED STATES PATENTS

| 1,263,542 | Evans | Apr. 23, 1918 |
| 1,401,097 | Nickolaus | Dec. 20, 1921 |
| 1,708,224 | Harris | Apr. 9, 1929 |
| 2,275,397 | Davies | Mar. 3, 1942 |
| 2,675,874 | Springer | Apr. 20, 1954 |

FOREIGN PATENTS

| 3,905 | Great Britain | of 1872 |
| 40,435 | Switzerland | Apr. 9, 1907 |